United States Patent [19]

Jung et al.

[11] Patent Number: 5,802,119
[45] Date of Patent: Sep. 1, 1998

[54] ADAPTIVE CLOCK RECOVERY APPARATUS FOR SUPPORTING MULTIPLE BIT TRANSMISSION RATES

[75] Inventors: Dong Bum Jung; Hun Kang, both of Daejeon, Rep. of Korea

[73] Assignees: Electronics and Telecommunications Research Institute, Daejeon; Korea Telecommunication Authority, Seoul, both of Rep. of Korea

[21] Appl. No.: 754,093

[22] Filed: Nov. 20, 1996

[30] Foreign Application Priority Data

Dec. 22, 1995 [KR] Rep. of Korea .............. 95-53953

[51] Int. Cl.$^6$ ................................................ H04L 7/00
[52] U.S. Cl. ................................ 375/354; 348/537
[58] Field of Search ............................ 375/326–328, 375/354, 355, 359, 362, 371, 372; 348/524, 537

[56] References Cited

U.S. PATENT DOCUMENTS

| | | | |
|---|---|---|---|
| 4,713,691 | 12/1987 | Tanaka et al. | 348/537 |
| 4,847,678 | 7/1989 | McCauley | 348/537 |
| 5,260,978 | 11/1993 | Fleischer et al. | 375/354 |
| 5,473,385 | 12/1995 | Leske | 348/845.3 |
| 5,537,055 | 7/1996 | Smith et al. | 326/8 |
| 5,633,688 | 5/1997 | Choi et al. | 348/584 |
| 5,657,089 | 8/1997 | Onagawa | 348/537 |

OTHER PUBLICATIONS

Adaptive Clock Synchronization Schemes for Real-Time Traffic in Broadband Packet Networks; R.P. Singh and S.H. Lee; 1988; pp. 84–88.

Synchronous Techniques for Timing Recovery in BISDN; Richard C. Lau and Paul E. Fleischer; 1995; pp. 1810–1818.

*Primary Examiner*—Young T. Tse
*Attorney, Agent, or Firm*—Antonelli, Terry, Stout & Kraus, LLP

[57] ABSTRACT

An adaptive clock recovery apparatus. The adaptive clock recovery apparatus comprises a clock switching unit for switching a sample clock to be input from outside according to an adaptive clock controlling signal; a sample counting unit for inputting both a reset signal from the outside and an output from the clock switching unit, and outputting sample data by an operation depending upon a buffer state signal; an adaptive clock controlling unit for inputting the sample clock, the buffer state signal, the reset signal, and the sample data from the sample counting unit, and outputting the adaptive clock controlling signal to the clock switching unit; a reception frequency processing unit for inputting reception frequency from outside, and outputting frequency set up data; an adaptive clock generating unit for inputting both the frequency set up data from the reception frequency processing unit and the adaptive clock controlling signal from the adaptive clock controlling unit, and outputting the adaptive clock to the outside; and a buffering unit for outputting image data input from outside to the outside according to the adaptive clock of the adaptive clock generating unit, and also outputting the buffer state signal to the adaptive clock controlling unit and the sample counting unit, respectively.

2 Claims, 2 Drawing Sheets

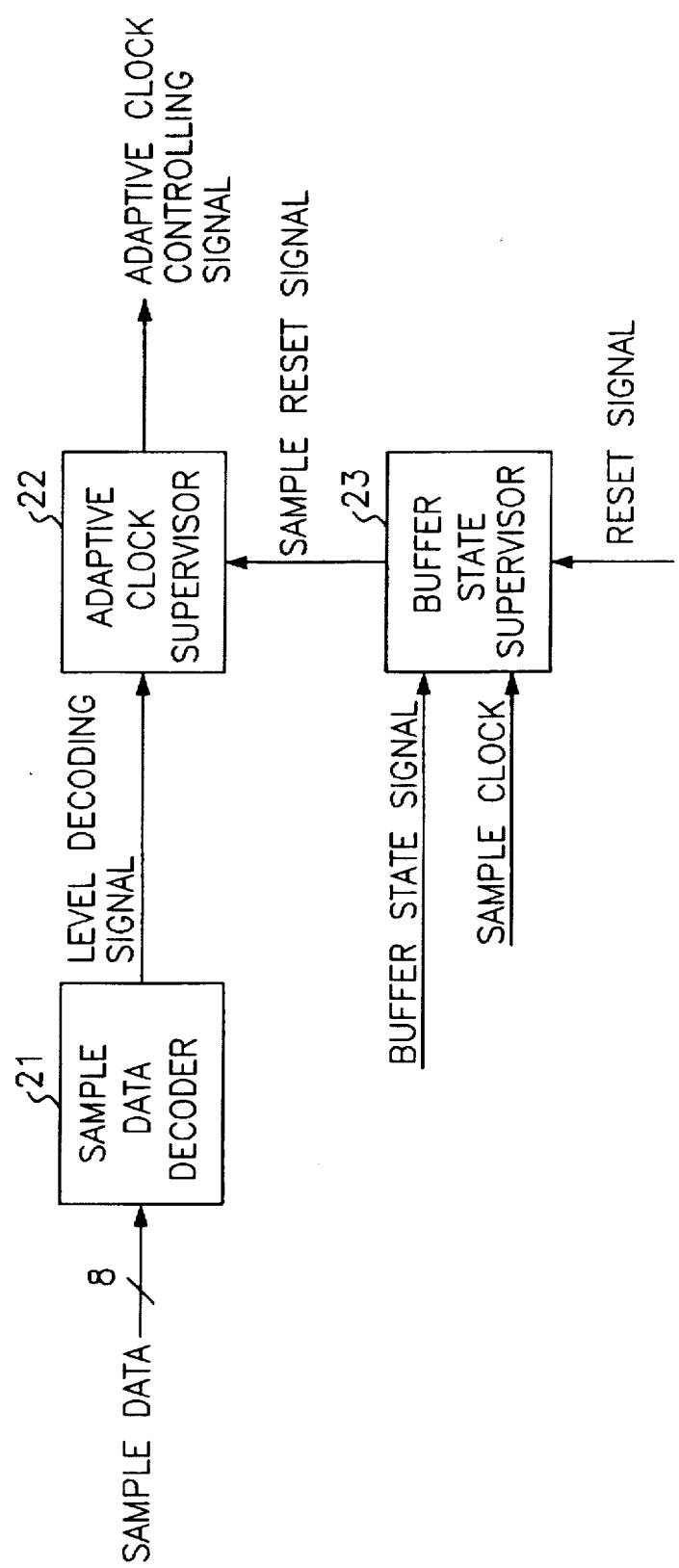

ADAPTIVE CLOCK RECOVERY APPARATUS FOR SUPPORTING MULTIPLE BIT TRANSMISSION RATES

BACKGROUND OF THE INVENTION

1. Field of the Invention

The present invention relates to an adaptive clock recovery apparatus for supporting in an ATM (Asynchronous Transfer Mode) network a video signal of a MPEG-2 (Moving Picture Expert Group-2) where transmission bit rates can be changed to 5~15 Mbps among services which use as a transmission method of B-ISDN (Broadband Integrated Service Digital Network).

2. Description of the Related Art

In the broadband integrated service digital network, an ATM cell of 53 octets of a packet is used to provide constant bit rates. Such an ATM cell is first converted into an ATM adaption layer-protocol data unit of 48 octets which consist of 47 octets with user information and 1 octet with an ATM adaption layer header, and is then transferred to the other party through the ATM network, after combining with ATM header of 5 octets.

A structure of an AAL type-1 transceiver having the constant bit rates is disclosed in Korean Application Nos. 92-24193 and 92-24194, respectively.

In the meantime, the International Telecommunication Unit ITU has published a paper on supporting in the ATM network the video signal of the MPEG-2 where the transmission bit rates can be changed to 5~15 Mbps among the services which use the ATM as a method of the B-ISDN.

SUMMARY OF THE INVENTION

It is therefore, an object of the invention to provide an adaptive clock recovery apparatus.

In order to recover to a corresponding bit transmission rate, transmission data from a MPEG-2 encoder having various bit transmission rates between 5~15 Mbps, the adaptive clock recovery apparatus of the present invention is employed to set up frequency of a clock combiner for recovering an adaptive clock, to the bit transmission rate of a corresponding reference frequency through call processing information from a transmitter. Further, after sampling a buffer state of a receiving part as a sample counter, the adaptive clock recovery apparatus of the present invention is subjected to control an output clock of the clock combiner functioned as a voltage controlled oscillator by means of an output of a digital-to-analog convertor. Thereby, the adaptive clock recovery apparatus in accordance with the present invention can be used in the ATM network without additionally providing a variety of motion picture services of constant bit rates given from the MPEG-2 according to every frequency.

To achieve the above object, the adaptive clock recovery apparatus in accordance with the present invention comprises a clock switching unit for switching a sample clock to be input from outside according to an adaptive clock controlling signal; a sample counting unit for inputting both a reset signal from the outside and an output from the clock switching unit, and outputting sample data based on a buffer state signal; an adaptive clock controlling unit for inputting the sample clock, the buffer state signal, the reset signal, and the sample data from the sample counting unit, and outputting the adaptive clock controlling signal to the clock switching unit; a reception frequency processing unit for inputting reception frequency from outside, and outputting frequency set up data; an adaptive clock generating unit for inputting both the frequency set up data from the reception frequency processing unit and the adaptive clock controlling signal from the adaptive clock controlling unit, and outputting the adaptive clock to the outside; and a buffering unit for outputting image data input from outside to the outside according to the adaptive clock of the adaptive clock generating unit, and also outputting the buffer state signal to the adaptive clock controlling unit and the sample counting unit, respectively.

BRIEF DESCRIPTION OF THE DRAWINGS

The above and other objects, advantages and features of the present invention will be more apparent from the following detailed description taken with the attached drawings in which:

FIG. 2 is a detailed configuration diagram of an adaptive clock controller according to the present invention.

DETAILED DESCRIPTION OF THE PREFERRED EMBODIMENT

Figure 1:
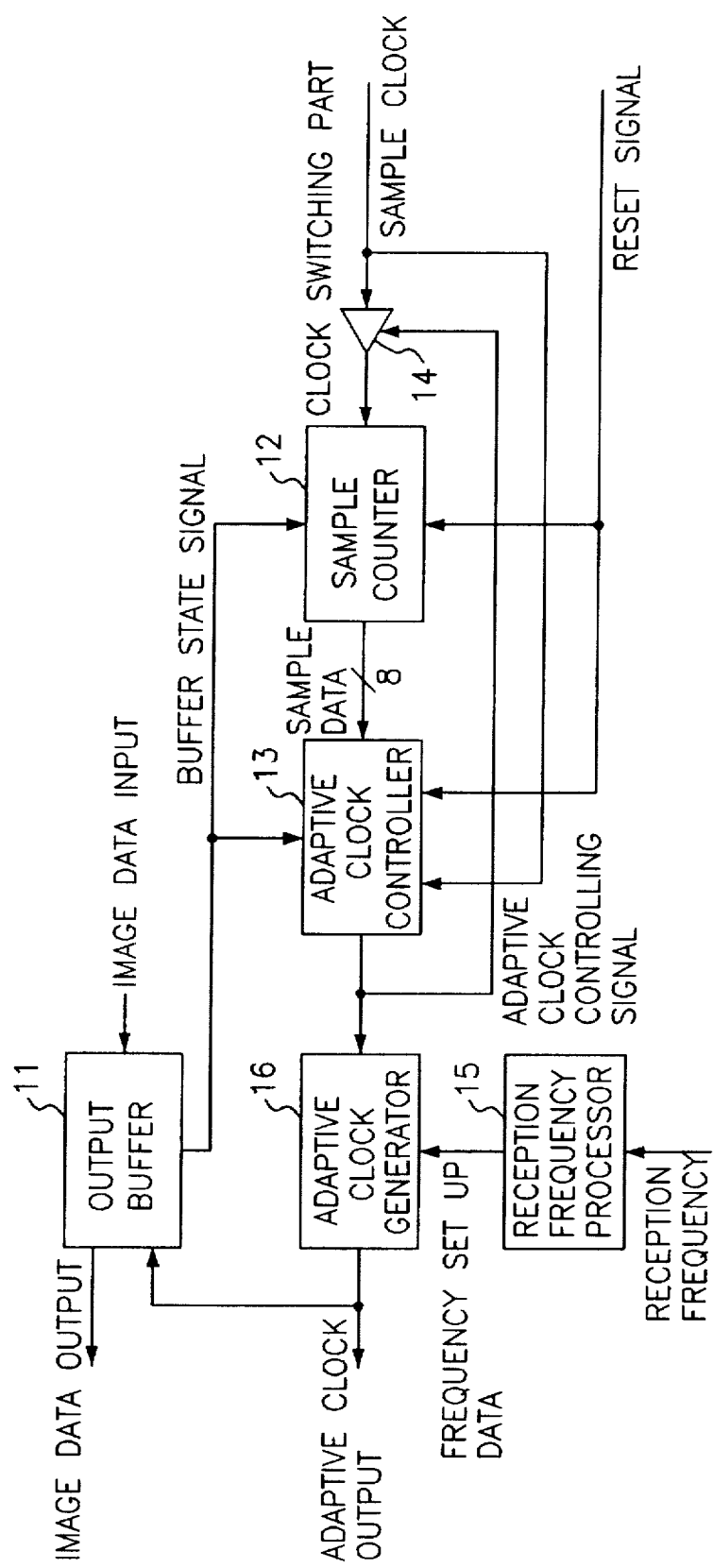
FIG. 1 is a configuration diagram of an adaptive clock recovery apparatus for supporting multiple transmission bit rates according to the present invention.

In the following description, the specific details are set forth to provide a more thorough understanding of the present invention. It will be apparent, however, to one skilled in the art, that the present invention may be practiced without these specific details. In other instances, well known features have not been described in detail so as not to obscure the present invention.

FIG. 1 is a configuration diagram of an adaptive clock recovery apparatus for supporting multiple transmission bit rates according to the present invention. In FIG. 1, a reference numeral 11 indicates an output buffer, a reference numeral 12 a sample counter, a reference numeral 13 an adaptive clock controller, a reference numeral 14 a clock switching part, a reference numeral 15 a reception frequency processor, and a reference numeral 16 an adaptive clock generator.

Referring to FIG. 1, there are provided in the adaptive clock recovery apparatus a clock switching part 14, a sample counter 12, an adaptive clock controller 13, a reception frequency processor 15, an adaptive clock generator 16, and an output buffer 11. The clock switching part 14 switches a sample clock to be input from outside according to an adaptive clock controlling signal to be output from the adaptive clock controller 13, and then outputs the switched sample clock to the sample counter 12. The sample counter 12 receives both a reset signal from outside and an output signal of the clock switching part 14 and is operated depending upon a buffer state signal output which the output buffer 11 supports. The adaptive clock controller 13 receives the sample clock and reset signal from the outside. Also, the adaptive clock controller 13 receives both the buffer state signal from the output buffer 11 and the sample data from the sample counter 12, and then outputs the adaptive clock controlling signal to the clock switching part 14 and the adaptive clock generator 16. The reception frequency processor 15 receives reception frequency from outside and outputs frequency set up data to the adaptive clock generator 16. The adaptive clock generator 16 inputs the frequency set up data from -the reception frequency processor 15 and also inputs the adaptive clock controlling signal from the adaptive clock controller 13 to thereby control the adaptive clock output and the output buffer 11, respectively. And, the output buffer 11 receives image data from outside and then outputs the input data to outside according to the adaptive clock output of the adaptive clock generator 16. Further, the output buffer 11 outputs the buffer state signal to the adaptive clock controller 13 and the sample counter 12, respectively.

The detailed operation of the adaptive clock recovery apparatus is as follows.

First of all, the adaptive clock recovery apparatus is initialized by the reset signal provided from an external system controller and is then driven by a sample clock provided from outside.

After receiving a cell from ATM network, the output buffer 11 for storing image data to be transferred to a demultiplexing part of a MPEG system, provides the buffer state signal to the sample counter 12 and the adaptive clock controller 13. The buffer state signal is used for informing the amount of data stored in the output buffer 11.

The sample counter 12 is operated depending upon the buffer state signal of the output buffer 11 so as to make a falling counter down to "0" and to make a rising counter up to "255" from the base point of a decimal 128, the sample counter 12 being composed of octet rising/falling counter. Here, if the buffer state signal is at a logic value "0", this means that the data over a half is stored in the output buffer 11.

In this case, the sample counter 12 is operated as the rising counter. On the other hand, if the buffer state signal is at a logic value "1", this means that the data below a half is stored in the output buffer 11. In this case, the sample counter 12 is operated as the falling counter. Thereby, sample counter 12 provides 8 bits sample data to the adaptive clock controller 13.

The adaptive clock controller 13 switches the sample clock to be input to the clock switching part 14 according to a value of the sample data received from the sample counter 12, and also controls the adaptive clock controlling signal to be output to the adaptive clock generator 16.

The reception frequency processor 15 receives the other party's transmission frequency through a call process from the external system processor and transfers it to the adaptive clock generator 16 to set up a reference frequency for communication. The reception frequency processor 15 is composed of a register and a logic circuit.

The adaptive clock generator 16 sets up any reference frequency between 5~15 MHz where the video signal of the MPEG-2 can be received, by inputting the frequency set up data from the reception frequency processor 15 and then provides the adaptive clock to the output buffer 11 in compliance with the adaptive clock controlling signal coming from the adaptive clock controller 13. Further, the adaptive clock generator 16 can adjust and output the image data according to the amount of data of the output buffer 11. In the meantime, the adaptive clock generator 16 can be constructed by "Cypress ICD2053B".

FIG. 2 is a detailed configuration diagram of an adaptive clock controller according to the present invention. In FIG. 2, a reference numeral 21 indicates a sample data decoder, a reference numeral 22 an adaptive clock supervisor, and a reference numeral 23 a buffer state supervisor.

Referring to FIG. 2, there are provided in the adaptive clock controller 13 a sample data decoder 21, a buffer state supervisor 23, and an adaptive clock supervisor 22. The sample data decoder 21 decodes an input sample data from the sample counter 12 and outputs a level decoding signal to the adaptive clock supervisor 22. The buffer state supervisor 23 inputs both the sample clock and the reset signal from outside, and also inputs the buffer state signal from the output buffer 11 to output a sample reset signal to initialize an operation of the adaptive clock supervisor 22. The adaptive clock supervisor 22 inputs both the sample reset signal from the buffer state supervisor 23 and the level decoding signal from the sample data decoder 21, and then outputs the adaptive clock controlling signal to the adaptive clock generator 16 and the clock switching part 14, respectively.

The detailed operation of the adaptive clock controller 13 is as follows.

First of all, the adaptive clock controller 13 is driven by the reset signal and sample clock from the external system controller.

The sample data decoder 21 consisting of logic AND gates and OR gates of 8 bits is provided with the sample data of 8 bits from the sample counter 12 to layer the level of the sample data from a logic value "255" to a logic value "0". Moreover, if the level of sample data is at the logic value "0" or "255", the sample data decoder 21 decodes the level to a binary value "1" so as to avoid that underflow or overflow is generated in the output buffer. Thereafter, the sample data decoder 21 transmits the level decoding signal to the adaptive clock supervisor 22 through the OR gate.

The adaptive clock supervisor 22 consisting of a flip-flop and an invertor stops operating the sample counter 12 by switching the sample clock to be input to the clock switching part 14, since the adaptive clock supervisor 22 changes, from the binary value "1" to the binary value "0". Further, the adaptive clock supervisor 22 controls an output of the output buffer 11 by controlling an output of the adaptive clock generator 16. Thereafter, the adaptive clock supervisor 22 begins to perform a normal operation through the sample reset signal to be provided when the buffer state is changed in the buffer state supervisor 23.

The buffer state supervisor 23 consisting of the flip-flop and the AND gate, supervises the buffer state signal to be input from the output buffer 11. Further, the buffer state supervisor 23 has a constant delay time for a stationary state in order to exactly extract a level stored in the output buffer according to the sample clock. Furthermore, the buffer state supervisor 23 provides the sample reset signal to the adaptive clock supervisor 22 through the AND gate when the buffer state is changed, and then controls a clock input of the clock switching part 14.

Accordingly, as mentioned in the foregoing description, the present invention is subjected to sampling of a stored state in the output buffer through a clock combiner to support both the stored state therein and the multiple bit transmission rates while the image service of the multiple level stationary bit rates to be transmitted from a MPEG-2 encoder is transferred through the ATM network. Thereby, there is provided an efficiency in that the adaptive clock recovery apparatus in accordance with the present invention can accept a MPEG-2 service of a variety of transmission bit rates in the ATM network.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An adaptive clock recovery apparatus comprising:

a clock switching unit for switching a sample clock to be input from outside according to an adaptive clock controlling signal;

a sample counting unit for inputting both a reset signal from said outside and an output from said clock switching unit, and outputting sample data by an operation depending upon a buffer state signal;

an adaptive clock controlling unit for inputting said sample clock, said buffer state signal, said reset signal, and said sample data from said sample counting unit, and outputting said adaptive clock controlling signal to said clock switching unit;

a reception frequency processing unit for inputting reception frequency from outside, and outputting frequency set up data;

an adaptive clock generating unit for inputting both said frequency set up data from said reception frequency processing unit and said adaptive clock controlling signal from said adaptive clock controlling unit, and outputting adaptive clock to said outside; and a buffering unit for outputting image data input from outside to said outside according to said adaptive clock of said adaptive clock generating unit, and also outputting said buffer state signal to said adaptive clock controlling unit and said sample counting unit, respectively.

2. The adaptive clock recovery apparatus as claimed in claim 1, wherein said adaptive clock controlling unit comprises:

a sample data decoding unit for decoding input sample data from said sample counting unit and outputting a level decoding signal;

a buffer state supervising unit for inputting said sample clock, said reset signal, and said buffer state signal from said buffering unit, and outputting a sample reset signal; and an adaptive clock supervising unit for inputting both said sample reset signal from said buffer state supervising unit and said level decoding signal from said sample data decoding unit, and outputting said adaptive clock controlling signal to said adaptive clock generating unit and said clock switching unit, respectively.

\* \* \* \* \*